United States Patent
Hardy et al.

(10) Patent No.: US 6,460,653 B1
(45) Date of Patent: Oct. 8, 2002

(54) COMBINED TRAILER AND HUNTING STAND OPERABLE BETWEEN ELEVATED AND COLLAPSED POSITIONS

(76) Inventors: Ronald M. Hardy, 100 Woodcrest Ave., Philadelphia, MS (US) 39350; Morgan D. Hardy, Rte. 4, Box 135A, Philadelphia, MS (US) 39350

( * ) Notice: Subject to any disclaimer, the term of this patent is extended or adjusted under 35 U.S.C. 154(b) by 0 days.

(21) Appl. No.: 09/812,790

(22) Filed: Mar. 15, 2001

(51) Int. Cl.$^7$ .............................. E04C 1/00; E06C 1/00
(52) U.S. Cl. ................................. 182/63.1; 182/69.5
(58) Field of Search ......................... 182/63.1, 69.1, 182/69.5, 69.6, 127, 116, 20, 187, 188, 141

(56) References Cited

U.S. PATENT DOCUMENTS

| | | | | |
|---|---|---|---|---|
| 610,602 | A | * 9/1898 | Doldt | 182/69.5 |
| 1,031,818 | A | * 7/1912 | Putman | 182/116 |
| 2,402,579 | A | * 6/1946 | Ross | 182/63.1 X |
| 2,972,392 | A | * 2/1961 | Kurvers | 182/69.5 X |
| 2,978,062 | A | * 4/1961 | Di Camillo et al. | 182/69.5 X |
| 3,664,459 | A | * 5/1972 | Stephens et al. | 182/63.1 X |
| 3,889,778 | A | * 6/1975 | Dotts | 182/63.1 X |
| 4,491,449 | A | * 1/1985 | Hawkins | 182/63.1 X |
| 4,657,113 | A | * 4/1987 | Costello | 182/63.1 |
| 5,102,179 | A | 4/1992 | Royer | 296/26 |
| 5,105,908 | A | 4/1992 | Freund | 182/20 |
| 5,295,555 | A | 3/1994 | Strange | 182/63 |
| 5,297,653 | A | * 3/1994 | Wurtz et al. | 182/63.1 |
| 5,297,844 | A | * 3/1994 | Haustein | 182/127 X |
| 5,409,081 | A | 4/1995 | Reeves | 182/63 |
| 5,564,523 | A | 10/1996 | Howard | 182/63 |
| 5,595,265 | A | 1/1997 | Lebrocquy | 187/261 |
| 5,645,292 | A | 7/1997 | McWilliams et al. | 280/494 |
| 6,158,550 | A | * 12/2000 | Arnoldy | 182/69.5 |

* cited by examiner

*Primary Examiner*—Daniel P. Stodola
*Assistant Examiner*—Hugh B. Thompson
(74) *Attorney, Agent, or Firm*—Jacobson Holman, PLLC (57) ABSTRACT

A portable, collapsible hunting box enclosure is constructed on a wheeled trailer. The hunting box enclosure may be raised and lowered through a scissor action support structure mounted on the trailer and powered by an electric winch. When the enclosure is to be transported, hinged wall panels enable the box to be folded and collapsed into a flat stack within the trailer. Once collapsed, reinforced wire panels or runners mounted on side members of the trailer rotate inward to overlay the collapsed box, providing a platform upon which an ATV may be loaded. The hunting stand/trailer combination may then be towed, with the ATV loaded thereon, by a full-size motor vehicle. Upon reaching a hunting area, the ATV may be unloaded and used to tow the hunting stand/trailer combination to a specific hunting site where the collapsed box is unfolded, to erect the enclosure, and elevated using the scissor action support structure.

20 Claims, 8 Drawing Sheets

COMBINED TRAILER AND HUNTING STAND OPERABLE BETWEEN ELEVATED AND COLLAPSED POSITIONS

BACKGROUND OF THE INVENTION

1. Field of the Invention

The present invention relates to a portable hunter's blind. More particularly, the present invention relates to a portable structure capable of being collapsed and transported to a desired area and then unfolded and elevated for use as a deer stand or other observational tower.

2. Description of the Related Art

A variety of portable hunter's blinds and deer stands have been known which include collapsible features, many of which are designed for transport in association with an ATV.

U.S. Pat. No. 5,102,179 to Royer discloses a hunting stand enclosure, formed of collapsible hinged panels, which is supported on telescoping posts and mounted on a trailer. When the enclosure is unfolded for use, the user elevates the entire hunting stand and trailer combination, either manually or with motorized power, from inside the enclosure. When in the lowered position, the hunting stand and trailer combination can be pulled by an ATV, but this combination does not itself act as a trailer for towing the ATV with a full-size motor vehicle.

U.S. Pat. No. 5,564,523 to Howard teaches a three-stage collapsible deer stand, each stage including detachable cross braces and telescoping vertical braces, which is supported on a trailer base. The vertical braces of each stage have a diameter slightly larger than the stage above, allowing the braces to be inserted one within the other to collapse the stand. When erected, the stand structure includes an open platform with pivotally attached guide rails comprising the area to be used by the hunter. As with the Royer patent, the collapsed stand with trailer can be pulled by an ATV but does not include any capability for transporting the ATV.

U.S. Pat. No. 5,409,081 to Reeves discloses a mobile elevated hunting stand, having a seat and legs, which is pivotally mounted to and transported by a motorized vehicle such as an ATV. The hunting stand may be tilted into a transporting position, in which the stand is fully supported by the vehicle, or the stand may be rotated to a hunting position with the legs on the ground. The stand does not collapse and would be difficult to maneuver into position in thickly wooded areas.

U.S. Pat. No. 5,295,555 teaches a hunting enclosure pivotally supported by a lift boom that relies upon hydraulic power to elevate the enclosure. The lower end of the lift boom is pivotally supported by an upright which is mounted in the forward portion of a trailer load bed. The rear portion of the trailer load bed can receive equipment, such as an ATV, for transport.

Neither the enclosure nor the lift boom is fully collapsible, making the entire apparatus rather bulky for transport. In addition, after the ATV is transported to a general hunting area, the hunting enclosure must be raised to unload the ATV. If the ATV is to be used to move the hunting enclosure to a particular site, the hunting enclosure must then be lowered for most convenient transport. Upon reaching the particular hunting stand site, the enclosure is again raised for use.

While these units may be suitable for particular uses, they do not demonstrate the combination of elements which render the present invention an ultimate portable box hunting stand.

SUMMARY OF THE INVENTION

The ultimate box hunting stand of the present invention offers a highly portable and yet full-featured hunting stand designed for use in conjunction with an ATV. The device is constructed on a single axle trailer and includes a box hunting enclosure which is mounted on scissor action supports that raise and lower the box enclosure. The enclosure has hinged sides to allow the box to be collapsed into a flat stack within the trailer for compact transport. When collapsed for transport, the box is overlaid and protected by reinforced wire runners which are connected to side members on the trailer and pivot into place, allowing an ATV to be loaded on the runners, directly over the box. The result is a hunting stand/trailer combination that, when ready for transport, occupies virtually the same amount of space as a trailer alone. This compact combination can be loaded with an ATV and easily towed by a full-size motor vehicle on a public road or highway. Once a hunting area is reached, the ATV can be unloaded and used to move the hunting stand/trailer combination through more rugged terrain to a particular stand location. The compactness of the hunting stand/trailer combination when collapsed makes even thickly wooded areas accessible.

In view of the foregoing, one object of the present invention is to overcome the difficulties of transporting an elevated box hunting enclosure into wooded areas, where clearances are often limited, through the use of a hunting stand/trailer combination that is highly compact when collapsed and yet can be fully and easily elevated for use.

Another object of the invention is to provide a box enclosure which protects the hunter from the elements and provides good visibility of game during use, while still being completely collapsible for flat storage during transport.

A further object of the invention is to provide a collapsible hunting stand built integral with a trailer that, when in the transport position, can be overlaid with reinforced wire runners onto which an ATV may be directly loaded.

An additional object of the invention is to provide a box hunting enclosure that can be elevated by scissor action supports which fold flat for compact transport.

Another object of the invention is to provide a deer stand which is easily and quickly set up, affording comfort to the hunter in use, and yet being completely and compactly mobile.

A further object of the invention to provide a collapsible and transportable deer stand that may be constructed efficiently and economically using readily available materials.

These and other objects of the invention, as well as many of the intended advantages thereof, will become more readily apparent when reference is made to the following description taken in conjunction with the accompanying drawings, wherein like numerals refer to like parts throughout.

DETAILED DESCRIPTION OF THE PREFERRED EMBODIMENTS

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1:
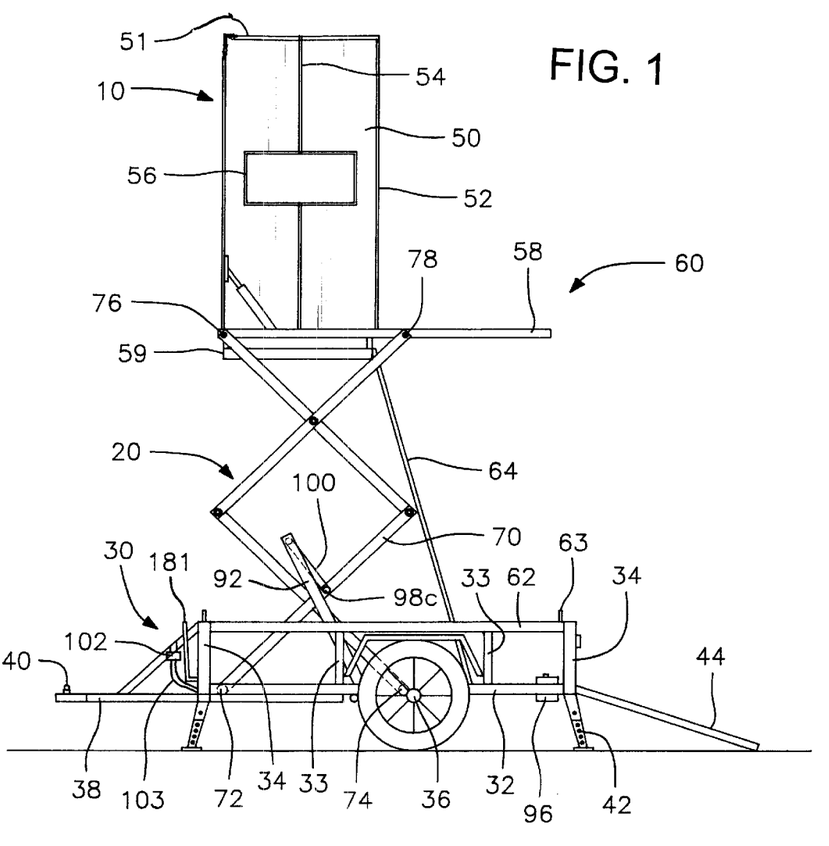
FIG. 1 is a side view of the combined trailer and box hunting enclosure of the present invention in a fully erected and elevated position.

Referring now more specifically to the drawings, FIG. 1 illustrates the preferred combination trailer and box hunting enclosure of the present invention. A box enclosure generally designated by the reference numeral 10, with scissor action support structure generally designated by the reference numeral 20, is mounted on a trailer generally designated by the reference numeral 30 and includes a lifting mechanism, according to the present invention.

The trailer 30 preferably includes a frame 32 having four upwardly extending corner members 34, vertical support members 33, at least one transverse wheeled axle 36 and a forwardly projecting trailer tongue 38 incorporating a ball hitch socket assembly 40 at its forward end. Each front corner member 34 is connected longitudinally to a respective rear corner member by a side rail 62. Each side rail 62 has two upwardly extending members 63. Each vertical support member 33 is connected between a respective side rail 62 and the frame 32. The frame 32 includes generally longitudinal members 32b and generally lateral members 32c, functionally joined as needed for the structural integrity of the frame 32 (see FIGS. 10 and 13A). The trailer 30 also preferably includes four extendable and retractable leveling jacks 42 projecting laterally from and supported by the four corners of the frame 32. While not visible in FIG. 1, the trailer 30 also includes a trailer frame floor 159 located behind the axle and large enough to provide support to the base of the ladder 64 and a convenient surface for standing upon to enter and exit the box enclosure once elevated. The frame floor 159 may be constructed of wood, sheet metal, or any other suitable material, and is connected to the frame 32 by bolting, welding, or any other technique suitable for the material of the floor, as would be known by one of skill in the art. Also not shown in FIG. 1, for purposes of clarity of the other elements, the trailer includes two pivotally mounted wire runners 80, each connected by connecting arms 65 to the upwardly extending members 63 on a respective side rail 62 (see FIGS. 4 and 10).

In the preferred embodiment, an access ramp 44 is pivotally mounted to the rear of the trailer for angular displacement of the ramp between a downwardly inclined loading position and an upright position closing the rear of the trailer. In an alternative embodiment, the trailer could be constructed without a ramp, in which case the trailer would have to be maneuvered into suitable terrain or facilities for loading of the ATV.

The box enclosure 10 has four generally rectangular wall panels 50, comprising two side panels, a front panel and a rear panel, a roof panel 51, and a box floor 59 formed as part of a platform generally designated by the reference numeral 60 and described more fully hereinafter. The front panel is the panel nearest the front side of the box, which is that side nearest the forward end or towing end of the trailer. In the preferred embodiment, all of the panels are constructed of sheet metal, but other building materials could be employed. The box floor 59 may be constructed of wood, sheet metal or any other suitable material. The longitudinal outer edges 52 of each wall panel 50 are connected by one or more hinges, such as piano hinges, to the longitudinal outer edges of respective adjoining panels. The roof panel is also hingeably connected to an upper lateral edge of one of the wall panels. In the preferred embodiment, the roof panel is hingeably connected to the upper edge of the front panel. The two side panels are preferably also hinged along a longitudinal center line 54. The rear panel has a door 57, hingeably attached thereto. The rear panel faces the rear end of the trailer 30. The opening for the door 57 is preferably larger than the door itself so that, when the door is closed, part of the opening in the rear panel remains open, allowing the occupant to look outside. The door preferably includes an outer door securing bolt 155 to secure the door prior to folding of the enclosure, and a latch 154 for securing the door during use of the enclosure.

Being fully collapsible, the box enclosure 10 has an erected position, in which the hunter may be situated within an enclosure formed by the wall and roof panels, and a collapsed position, in which the wall panels and the roof panel lie flat against one another. When the box is folded for collapse, the hinges along the longitudinal outer edges allow the panels to be oriented one against another. When collapsed, the folded box forms a flat horizontal stack of panels, generally designated by the reference numeral 84 (see FIG. 4). When the box is erected, the four wall panels stand upright and form a box, enclosing a space defined by four approximately 90° corners and covered by the roof panel.

In the erected position, the box affords the hunter with protection from the weather while also shielding many of his movements from observation outside the box. In the preferred embodiment, each wall panel includes an opening 56 through which the hunter can watch for and ultimately fire at wild game. With an opening in each wall panel, full 360° coverage of the surrounding area is possible.

The box is mounted on and attached to the platform 60 which includes two longitudinal side extension members 58 and two lateral members 58a and 58b. The two longitudinal side extension members 58 extend rearwardly from the rear side of the box so as to be parallel with the side rails 62 of the trailer 30. Each longitudinal side extension member 58 has a front end and a rear end, corresponding to the front side and the rear side of the trailer 30, the box 10 and the platform 60, respectively. A front lateral member 58a joins the front ends of the side extension members, and a rear lateral member 58b joins the rear ends of the side extension members. The platform also includes box floor 59, located beneath and approximating the rectangular area covered by the erected box. Extending from the rear edge of the box floor 59 is a platform rod 158, which can be seen in FIG. 2A. The platform rod 158 has a main portion running parallel to the rear edge of the platform and is attached preferably at either end to the rear edge of the box floor 59.

Figures 3, 11:
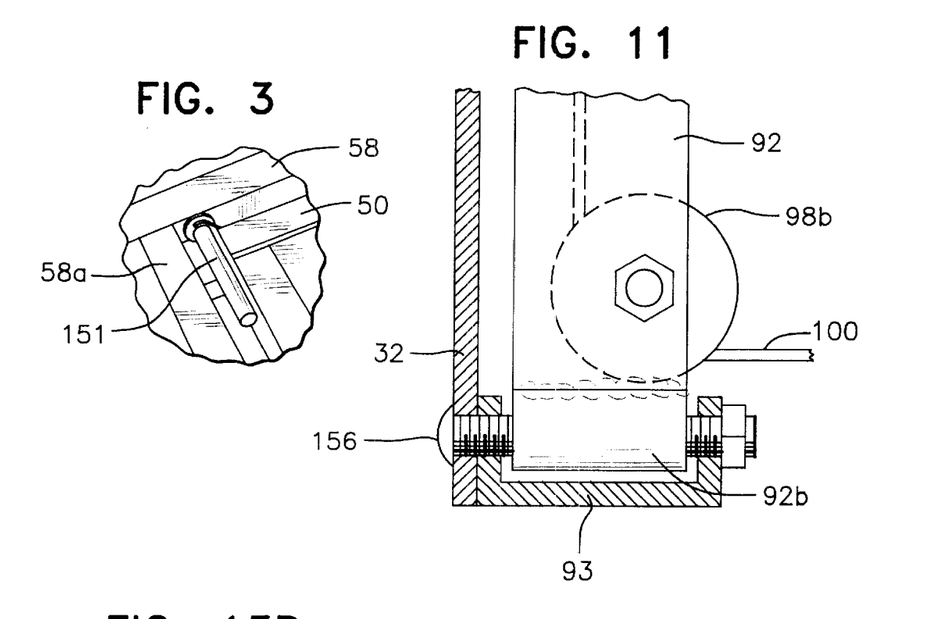
FIG. 3 illustrates the connection between the box enclosure and the platform in accordance with the present invention.
FIG. 11 is a cross-sectional view along line 11—11 in FIG. 10, showing the connection between the bottom of the lift arm, shown in the lifting position, and the trailer frame.

As shown in FIG. 3, the box enclosure 10 is connected to the platform 60 with pins 151 welded to the left and right bottom corners of the front panel 50 of the box. Each pin 151 fits into an opening in the respective side extension member 58, near the respective interconnection of the front lateral member 58a to the side extension member 58. When the panels are in a folded, stacked condition, the folded structure pivots on the pins 151 between horizontal and vertical positions.

Figures 2, 2A:
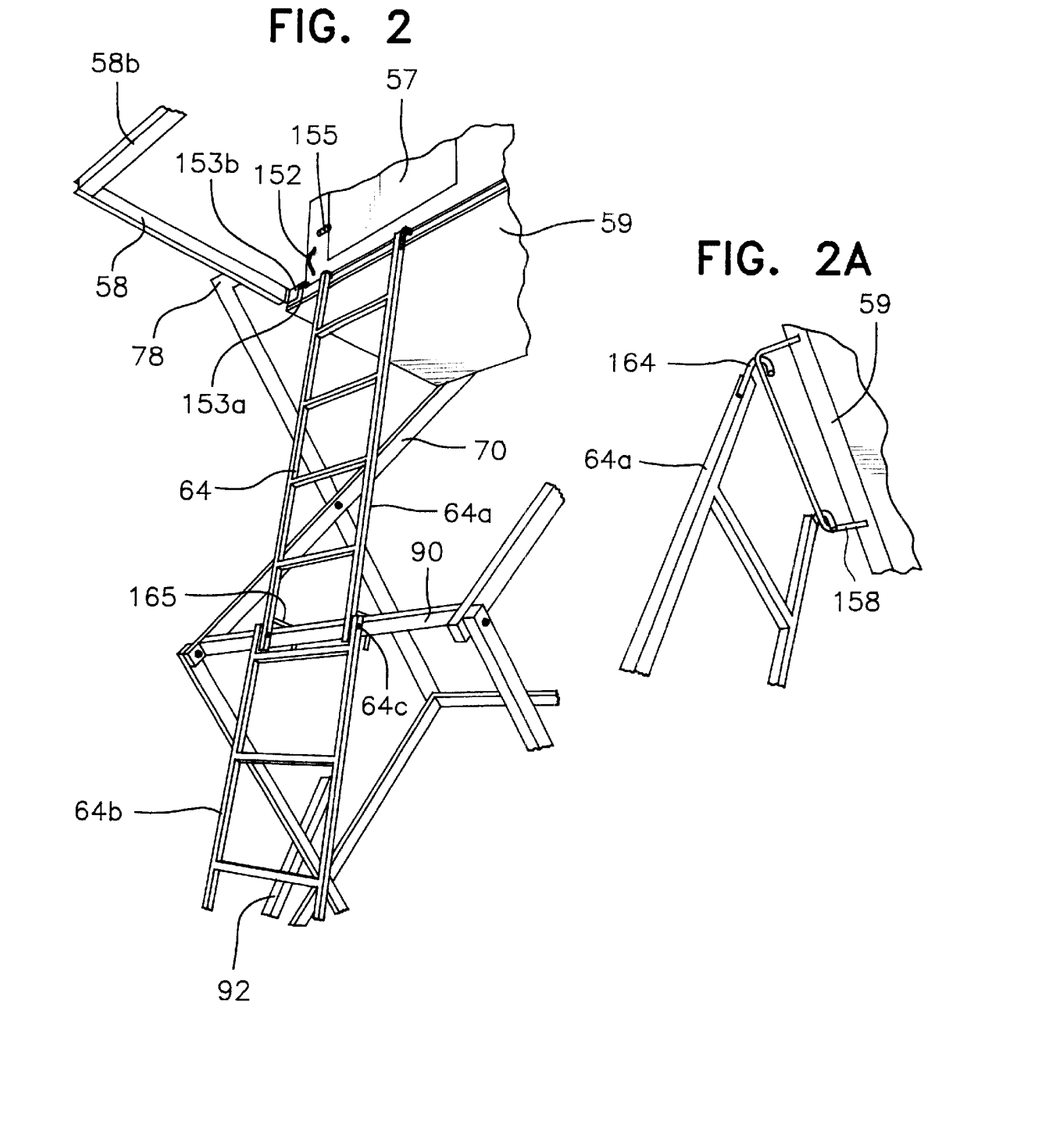
FIG. 2 is a perspective view of the ladder as attached to the platform and scissor action support in accordance with the present invention.
FIG. 2A is a bottom perspective view of the curved pieces at the top of the upper portion of the ladder, hooked over the platform rod, in accordance with the present invention.

Looking at FIG. 2, when the box is in the elevated position, a collapsible ladder 64 may be used by the hunter to access the box 10 from the rear side. The ladder includes side rails interconnected by transverse rungs. In the preferred embodiment, the ladder 64 is hinged near the longitudinal center, creating an upper portion 64a and a lower portion 64b. The top of each of the side rails in the upper portion includes a curved piece 164 that is used to hook the top of the ladder over the main portion of the platform rod 158, as shown in FIG. 2A. In addition to the curved pieces 164 at the top of the upper portion 64a of the ladder 64, the lower end of each side rail of the upper portion 64a also includes a hook-like extension 165 that secures the center of the ladder over and against the rear horizontal stabilizing member 90 of the scissor action support structure 20 for stability when in use. Preferably, the curved pieces 164 and hook-like extensions 165 are welded to the ladder, but other means of attachment may be employed.

The upper end of the lower portion 64b is pivotally connected to the lower end of the upper portion 64a by pivot connection 64c. The pivot connection 64c may be achieved with bolts, one passing through the bottom of the right side rail of the upper portion and the top of the right side rail of the lower portion, and a second passing through the bottom of the left side rail of the upper portion and the top of the left side rail of the lower portion. The ladder 64 may thereby be folded into a transport position so that the bottom of the lower portion 64b is adjacent the upper end of the upper portion 64a and the upper and lower portions lie in parallel with one another. The ladder may be conveniently stored between the runners 80.

When the ladder 64 has been attached to the platform rod 158 and horizontal stabilizing member 90 using the curved pieces 164 and hook-like extensions 165, respectively, the ladder may be unfolded into an extended climbing position. In the extended climbing position, the lower portion 64b is rotated 180° outward and downward so as to be in series with the upper portion 64a and in a plane therewith, the bottom of the lower portion 64b resting on and supported by the frame floor 159. The ladder 64 may then be used to enter and exit the box enclosure 10.

The box enclosure 10 is elevated using the scissor action support structure 20. The scissor action support structure 20 has a lower end mounted on the trailer 30 and an upper end attached to and supporting the platform 60 upon which the box is mounted. The scissor action support structure 20 includes two generally parallel scissor action supports 70, spaced apart and oriented longitudinally on the trailer 30, which are interconnected by a plurality of laterally oriented horizontal stabilizing members 90.

Each scissor action support 70 has two base ends and two upper ends. The two base ends include a first base end 72 pivotally mounted to the trailer 30 and a second base end 74 slidingly supported by the trailer 30. When the scissor action support 70 is in the lowered position, the second base end 74 is at or near the respective rear corner member 34. As the scissor action support is lifted to elevate the box and platform, the second base end 74 slides forwardly along a slide channel or track 32a in the frame 32. The second base end may slide using a roller. The second base end 74 includes a locking mechanism which, in the preferred embodiment, is embodied as a pin 74a which extends laterally outward from both sides of base end 74 (see FIG. 13B). The pin 74a acts in conjunction with a safety locking mechanism, generally designated by the reference numeral 184, to secure the sliding end once the scissor action support has been fully elevated.

The two upper ends of the scissor action support 70 include a first upper end 76 and a second upper end 78. The first upper end 76 is fixedly connected to the front end of a respective side extension member 58. The second upper end 78 is slidingly engaged with the respective side extension member 58 such that, when the scissor action support 70 is in the lowered position, the second upper end 78 is at or near the rear end of the respective side extension member 58. As the scissor action support is lifted to elevate the box 10 and platform 60, the second upper end 78 slides forwardly along a slide channel or track, not shown, in the respective side extension member 58. Scissor action supports 70 such as used in the present invention are known and may be constructed by one of ordinary skill in the art.

Figure 4:
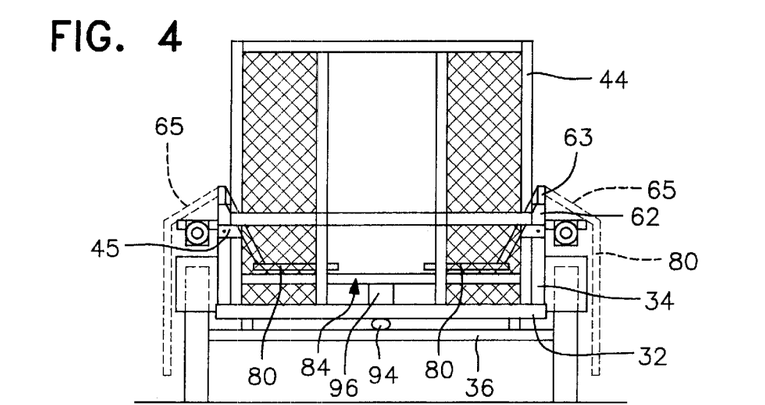
FIG. 4 is a rear view of the present invention in a lowered position with the ramp upright ready for transport.

Turning now to FIG. 4, the rear view of the hunting stand/trailer combination of this invention is shown in the fully collapsed and lowered position with the ramp 44 in the upright position ready for transport. Each side rail 62, supported by respective upwardly extending corner members 34, in turn supports the reinforced wire panel or runner 80 through upwardly extending members 63 and connecting arms 65. The connecting arms 65 are pivotally mounted to upwardly extending members 63 of the respective side rail 62, allowing angular displacement of the wire runner 80 between a first outwardly vertically inclined open position, shown by phantom lines, and a second inwardly horizontally inclined transport position, shown by solid lines. When the runners 80 are in their open position, the box enclosure may be unfolded and elevated. When the box enclosure is folded and collapsed into the horizontal stack of panels 84, the arms 65 and runners 80 may be rotated inwardly into their transport position, where they are situated directly above and overlying the horizontal stack of panels 84. When in the transport position, an ATV may be loaded upon the runners 80 and supported thereon.

Figure 5:
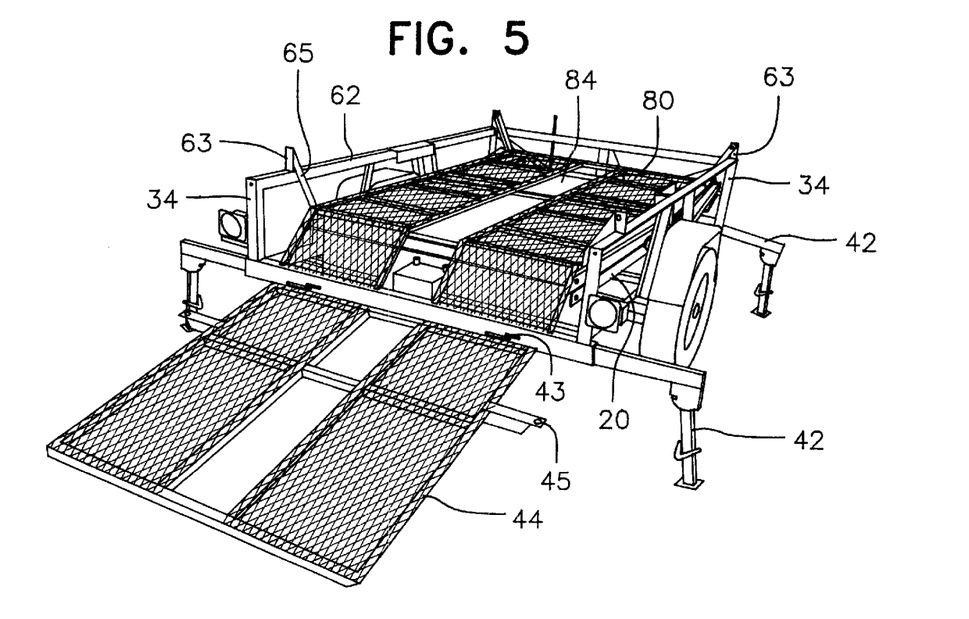
FIG. 5 is a rear perspective view of the trailer and enclosure combination of the present invention in the lowered position, supported by leveling jacks, ready for loading of an ATV.

FIG. 5 shows a rear perspective view of the trailer with the runners 80 in their transport position and the ramp 44 in the loading position. The leveling jacks 42 are shown in their extended and lowered position to stabilize the trailer 30. As shown, the horizontal stack of panels 84 and scissor support structure 20, when fully lowered, fit beneath the runners 80 for highly compact travel. To prepare the trailer for transport, the leveling jacks 42 are raised and retracted, and the ramp 44 is pivoted on hinges 43 to lift the ramp into the upright position. Each side of the ramp 44 includes a laterally extending bracket 45 which may be fastened against a respective rear corner member 34 with any suitable fastening element, thereby securing the ramp 44 in the upright position. The fastening element may include bolts, C-shaped fasteners or any other fastener as is known in the art.

When the hunting stand/trailer combination has been hauled to a desired location for use of the hunting stand, the ramp 44 is lowered to the loading position and the leveling jacks 42 are extended and lowered to level and stabilize the trailer, as shown in FIG. 5. The runners 80 are rotated outwardly to their vertically inclined open position, exposing the horizontal stack of panels 84 comprising the box 10.

Figure 6:
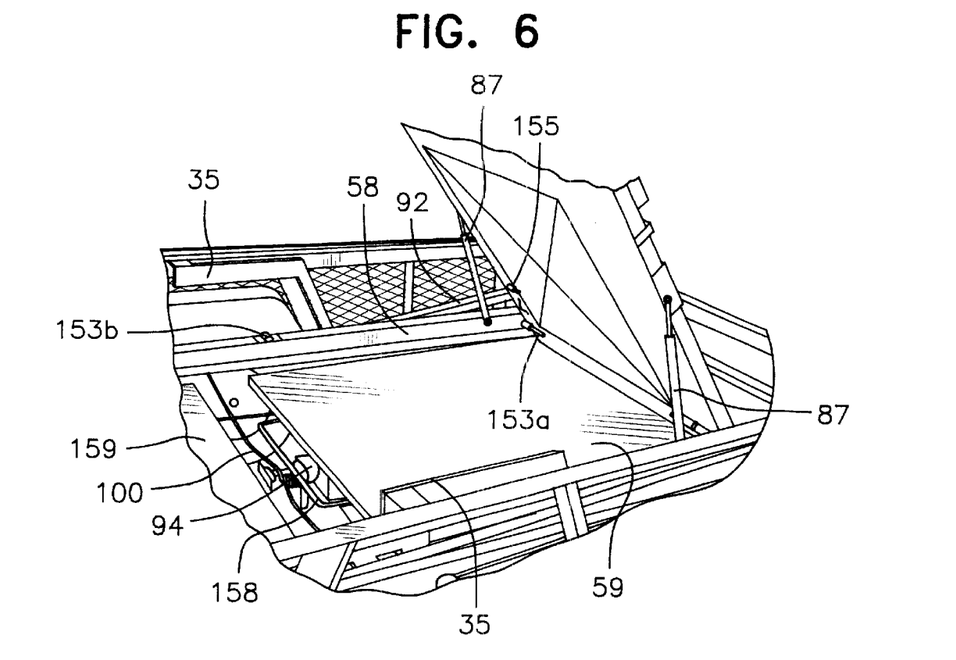
FIG. 6 is a partial perspective view showing the box hunting enclosure of the present invention in a partially erect position.

As shown in FIG. 6, one or more gas-assist shocks 87 are included to assist in raising and lowering the box 10. The bottom of each shock is mounted on a respective side extension member 58 and the top of each shock is attached to a respective side of the box, near the corner edge 52 where the side panel meets the front panel. To raise the box, the tops of the panels are lifted up and off the box floor 59, pivoting the structure relative to the platform on the pins 151 connected to the bottom of the front panel, as shown in FIG. 3.

Figure 7:
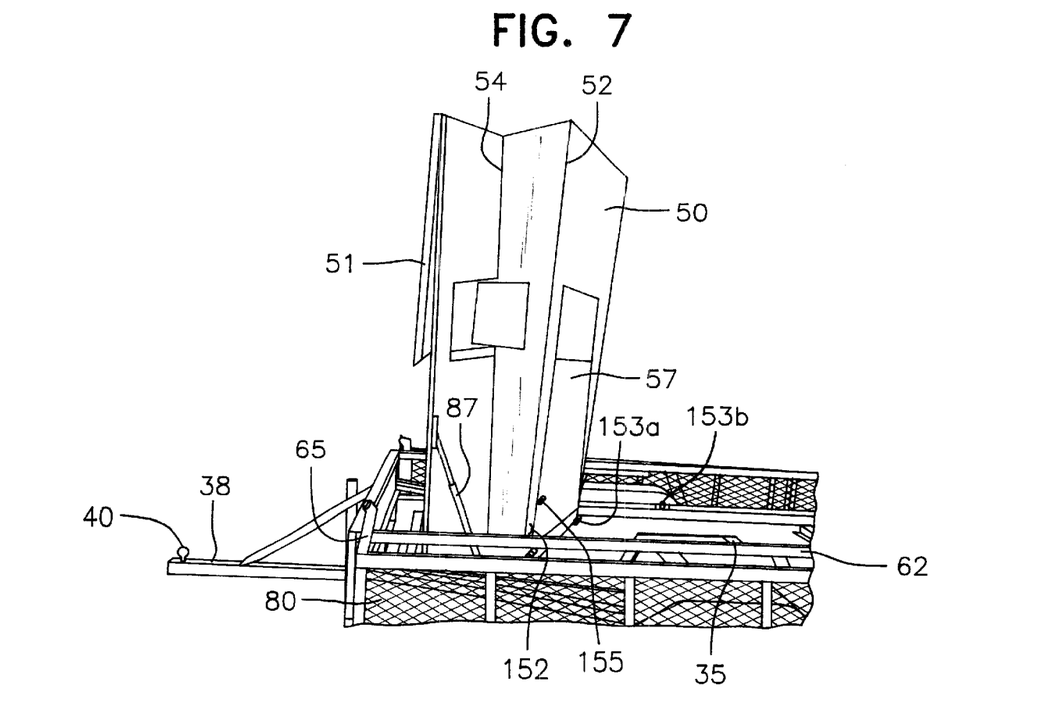
FIG. 7 is a partial side view showing the box hunting enclosure of the present invention in a partially unfolded position.
Figure 8:
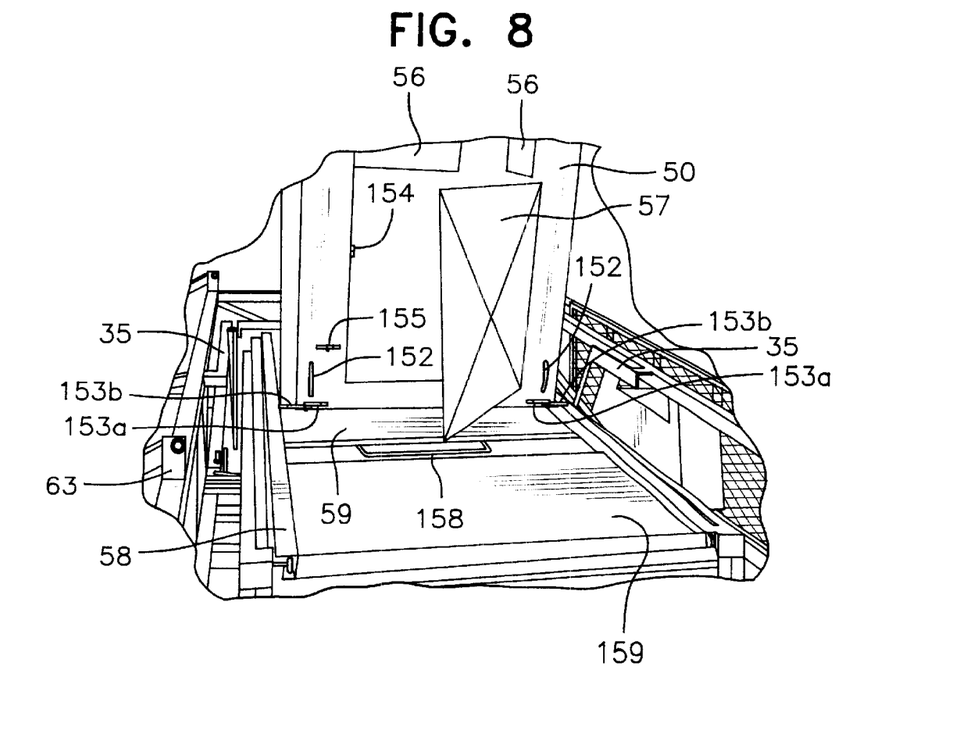
FIG. 8 is a rear view of the box hunting enclosure of the present invention, fully unfolded and locked into the erected position.

In FIG. 7, the wall panels 50 and roof panel 51 have been lifted to a vertical orientation and partially unfolded along both the corner edges 52 and the longitudinal center lines 54. Handles 152 mounted on the rear panel are used to pull the rear panel rearwardly, unfolding the two side panels. When the side panels have been fully unfolded, as shown in FIG. 8, door bolts 153*a* mounted on the lower corners of the rear panel 50 latch into receiving hardware 153*b* mounted on the side extension members 58 to lock the box into the erected position. Any conventional locking connection can be employed for bolts and hardware 153*a* and 153*b*.

The roof 51 is pivoted on its hinges to cover the top of the enclosure. In the preferred embodiment, the roof 51 includes two lengths of angle iron, each situated near a center of a respective side edge and running parallel thereto. When the roof covers the box, the angle iron prevents the respective side wall from folding inward. Alternatively, four pieces of angle iron may be used, two on each side of the roof, trapping the respective side wall on either side of the center line 54 and thereby preventing the side wall from moving in or out. A sliding pin, or other conventional securing element, secures the roof 51 against the top of the wall panels 50 during use.

The box 10 is entered through the door 57, which includes a cabinet latch 154, interior door bolt, or equivalent structure for holding the door in the closed position once the user is inside. An outer door securing bolt 155 is also mounted on the outside of the rear panel for holding the door 57 in place during folding and transport.

Figure 9:
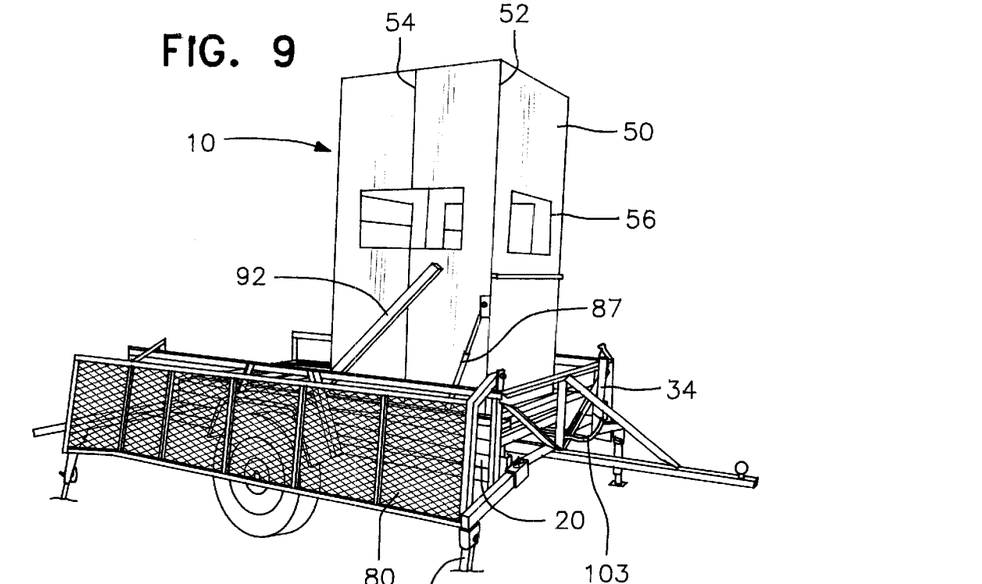
FIG. 9 is a perspective view showing the box hunting enclosure of the present invention, fully erected and ready to be elevated.
Figure 10:
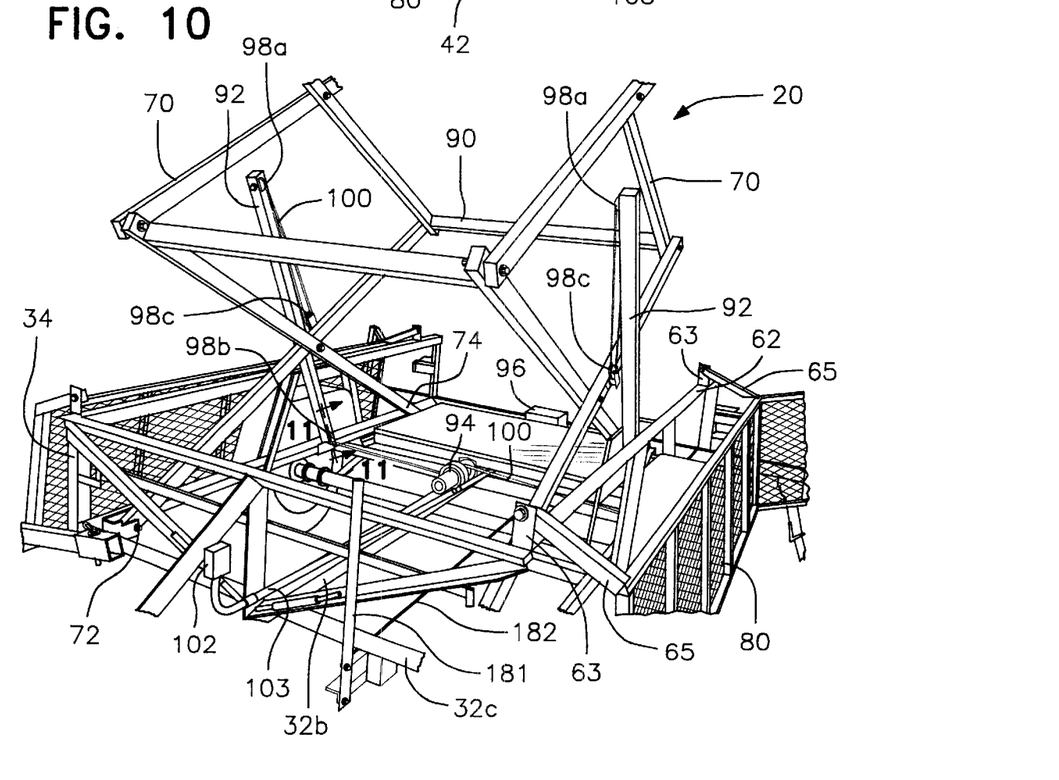
FIG. 10 is a partial perspective view of the scissor action supports in accordance with the present invention, showing the winch-powered lifting mechanism.

FIG. 9 illustrates the box 10 fully unfolded, erected, and prepared to begin lifting, with the runners 80 in their open position and the scissor action support structure 20 fully lowered. FIG. 10 illustrates the scissor action support structure 20 in a partially elevated position. The two scissor action supports 70 are connected by horizontal stabilizing members 90. Each scissor action support 70 has a first base end 72 fixedly mounted to the trailer 30 and a second base end 74 slidingly supported by the trailer. The scissor action support structure 20 is raised and lowered using power means. In the preferred embodiment, the power means may be embodied as an electric winch 94, a battery 96, a plurality of pulleys 98, a cable 100, and two lift arms 92, one for each scissor action support 70, each lift arm 92 having an interior channel.

One end of each lift arm 92 is pivotally mounted to the frame 32 for angular displacement between a generally horizontal transport position and an upwardly and forwardly directed lifting position. This pivotal or lower end is lowermost when the lift arm 92 is in the lifting position. The lift arms 92 move from the generally horizontal transport position to the raised lifting position, responsive to tension applied to the lifting cable 100, so as to follow the center of the load. Accordingly, the lift arms 92 as shown in FIG. 9 have been raised by the applied tension, preparatory to lifting the platform 60.

As shown in FIG. 11, in the preferred embodiment a piece of pipe 92*b* is welded to the lower front surface of the lift arm 92. The lift arm 92 is then pivotally attached to the frame 32 by a bolt 156 passing through the frame, the piece of pipe 92*b* and associated angle iron 93. The lift arm 92 pivots on the bolt 156. Lift arm cradles 35, shown in FIG. 6, guide the lift arms 92, providing lateral support and a positive stop, if necessary, when the lift arms are in their raised lifting position.

The electric winch 94 is mounted to the frame 32 of the trailer on a longitudinal frame member 32*b* between the lift arms 92. The battery 96 is operatively connected to the winch 94. The electric winch may be activated by a switch 102 mounted on the frame 32 and operatively connected to the winch through a power connecting rod 103 with wiring. Alternatively, the switch 102 may be located wherever convenient for use. In the preferred embodiment, the switch 102 is a rocker switch which activates and deactivates the winch 94 as the switch is manipulated. This allows the user to stop and restart the raising or lowering operation, during the process, as necessary. The winch 94 also preferably includes an internal brake mechanism.

The plurality of pulleys 98 are mounted on the scissor action support structure 20. In the embodiment shown in FIG. 10, for each scissor action support 70, the plurality of pulleys 98 may include an upper pulley 98*a*, a lower pulley 98*b* and a point of lift pulley 98*c*. The upper pulley 98*a* is mounted on an inner surface of the upper end of the lift arm 92, namely the end opposite the lower end and uppermost when the lift arm is in the raised lifting position. The lower pulley 98*b* is mounted on an inner surface of the lower end of the lift arm 92. The point of lift pulley 98*c* is mounted to an outer surface of the scissor action support 70.

A cable 100 runs through the plurality of pulleys 98, transferring rotational power from the winch 94 to apply vertical lift to the scissor action supports 70. More specifically, the cable 100 runs outward from the winch 94 to each of the lower pulleys 98*b* as shown in FIGS. 10 and 11. For each scissor action support 70, the cable 100 then runs from the lower pulley 98*b*, through the channel in the lift arm 92, to the upper pulley 98*a*. From the upper pulley 98*a*, the cable runs to the point of lift pulley 98*c* and then back to the lift arm 92. The end of the cable is tied off and anchored to the upper end of the lift arm 92. When power is supplied to the winch 94, rotational power exerted by the winch 94 is transferred through the pulleys 98 to create vertical lift on the scissor action supports 70 at the point of lift pulley 98*c*. The vertical lift unfolds the scissor action supports 70 from their horizontal position in the trailer 30 and, as they unfold, the scissor action supports 70 lift the platform 60. Anchoring the end of the cable 100 to the lift arm 92 provides benefits during both the raising and lowering of the platform. When raising the platform, the anchor increases the lifting capacity of the pulley and cable system. When lowering the platform, the anchor slows the rate at which the platform comes down such that, even if the brake mechanism inherent in the winch should malfunction, the platform would not fall precipitously.

Figure 12:
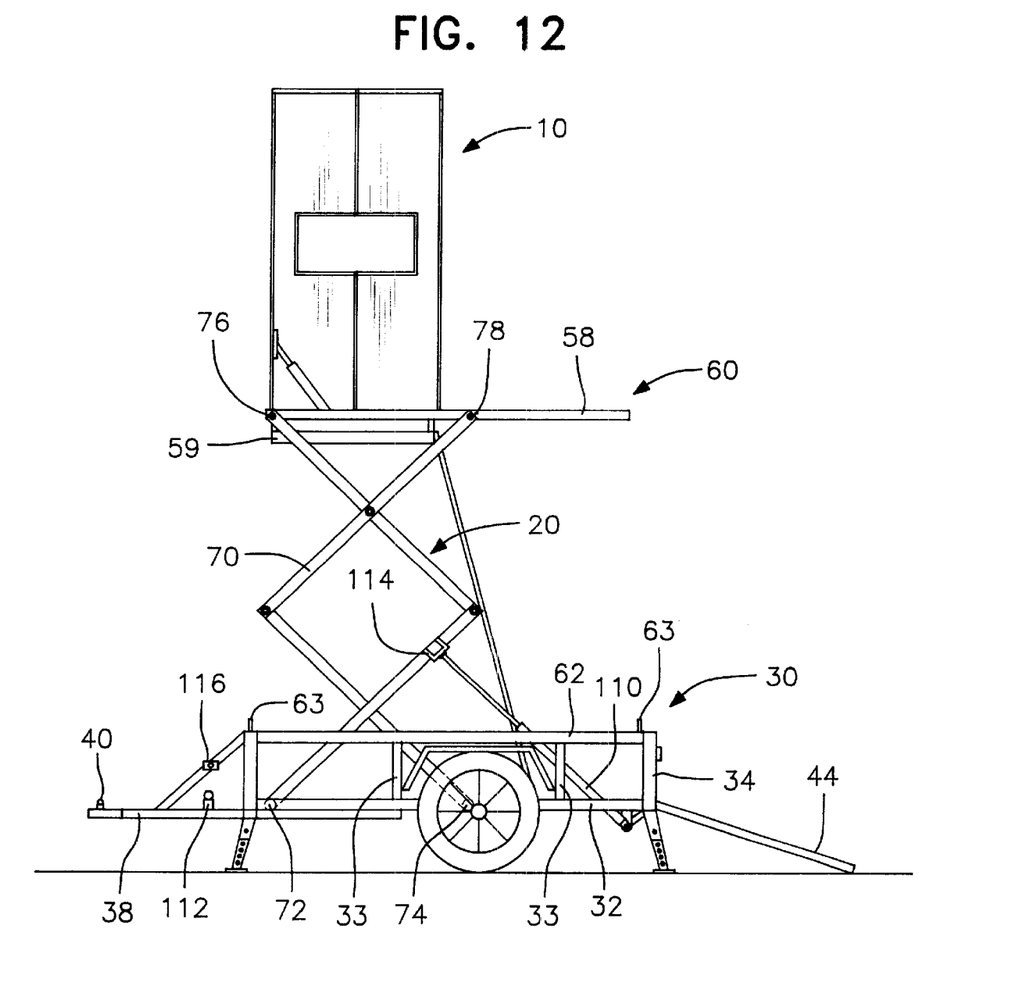
FIG. 12 is a side view of an alternative embodiment showing a hydraulic lifting mechanism in accordance with the present invention.

In an alternative embodiment shown in FIG. 12, the lifting power may be supplied by at least one hydraulic cylinder 110 and hydraulic pump power assembly 112. The hydraulic cylinder 110 is pivotally connected to the frame 32 of the trailer and to a point of lift 114 on the scissor action support structure 20. The hydraulic pump power assembly 112 is operatively associated with the hydraulic cylinder 110 for effecting extension and retraction of the cylinder 110 as it moves from a generally horizontal position within frame 32 when retracted to an angulated position when extended. The power assembly 112 may be operated via a suitable control 116. In the event multiple hydraulic cylinders are used, such as one on each scissor support structure, each cylinder may be independently controlled by a respective power assembly or multiple cylinders may be controlled by a single power assembly. Hydraulic cylinders and power assemblies are known and may be implemented with the present invention by one having ordinary skill in the art.

In a further alternative embodiment, the power source for activating the scissor action support structure could be controlled from inside the box hunting enclosure. Such control would allow the hunter to enter the box while the scissor action support structure was in the lowered position. Once inside, the hunter could use the control to initiate the power source for raising and/or lowering of the scissor action support structure. Such control may be embodied as any sort of suitable remote controls, whether wired or wireless, as would be known to persons of ordinary skill in the art.

Figure 13A:
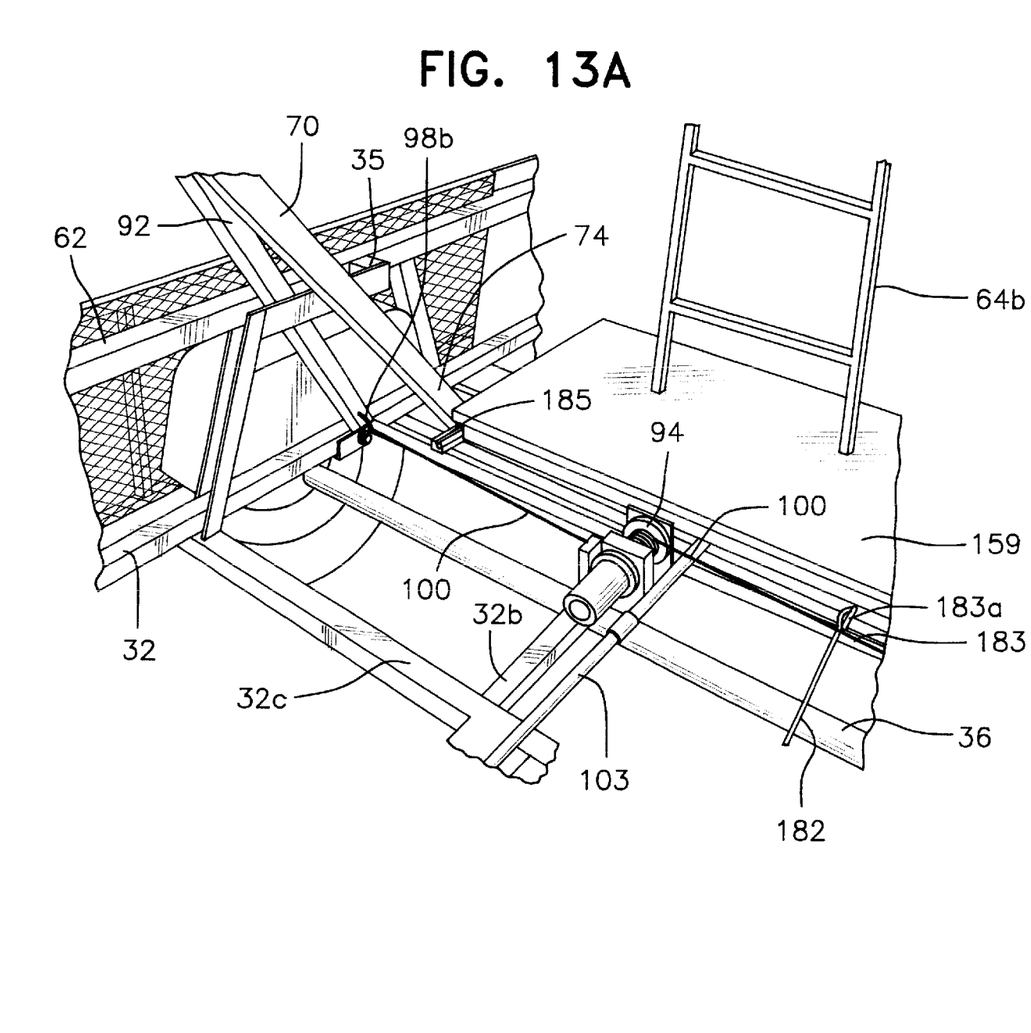
FIGS. 13A–13C illustrate the components of the safety locking mechanism in accordance with the present invention.
Figure 13B:
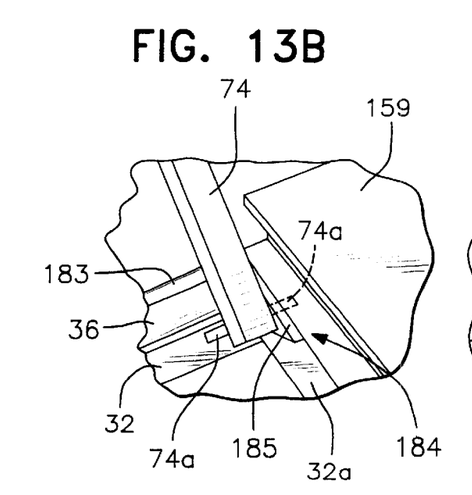
Figure 13C:
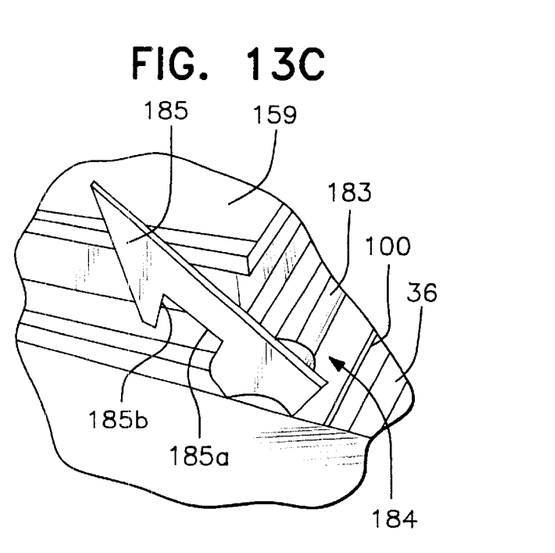

As shown in FIGS. 10 and 13A–C, the present invention further includes a safety locking mechanism 184 for locking the scissor action supports 70 in place when they are in the fully upright position. In the preferred embodiment, the safety locking mechanism comprises a safety lever 181, one or more notched safety catches 185, a connecting rod 183 and a pull rod 182. Preferably, there are two safety catches 185, one safety catch located on either side of the frame floor 159. The forward end of each safety catch 185 is connected, preferably by welding, to the connecting rod 183, but other means of connecting the catches may also be employed. The connecting rod is situated transversely to the safety catches and the longitudinal members 32b of the frame 32, parallel to the axle 36 and lateral frame members 32c, just to the rear of the winch 94. The pull rod 182 is connected at one end to the connecting rod 183, and is generally perpendicular to the connecting rod 183. In the preferred embodiment, this connection includes a transverse upwardly extending arm of flat steel 183a, attached to the connecting rod, to which the pull rod 182 is connected. The upwardly extending arm 183a provides leverage to facilitate the counter-clockwise rotation of the connecting rod 183 (as seen in FIG. 13C) necessary to lift and release the safety catches. The other end of the pull rod 182 is connected to the base of the safety lever 181, which is mounted on the frame 32 at the front of the trailer 30.

When the scissor action support structure 20 is folded, or in the lowered position, the safety catches 185 have a horizontal orientation resting in the slide channel 32a provided in a longitudinal member 32b of the frame 32 for movement of the base ends of the scissor action supports 70. The tip of each safety catch 185 faces rearward and preferably is pointed. An underside of the pointed tip slopes forwardly and downwardly to a point where the slope ends. The notched area 185a is forward of the slope end. The base end 74 of the scissor action support 70 has a protruding pin 74a. As the base end 74 slides forwardly in the channel 32a during the lifting operation, the pin 74a protruding from the base end 74 rides under the tip of the safety catch 185 and along its slope, pushing the safety catch up, which allows the base end 74 to continue its forward movement. When the base end has moved fully forward, the pin 74a reaches the notched area 185a, which allows the safety catch to fall, trapping the pin 74a in the notch 185a and thereby preventing the base end from moving rearwardly. Further, the front edge 185b of the notch is sloped such that an acute angle is formed into which the pin is trapped. With this configuration, inadvertent release of the safety catches, through bumping of the safety lever 181 for example, is prevented.

A safety catch in the locked position is shown in FIG. 13B. The base end 74 is shown resting on a lateral member 32c, of the frame 32. The portion of the pin 74a shown in phantom lines extends into notch 185a. The axle 36 is visible beneath and behind the connecting rod 183.

To release the safety catches 185, the winch must be activated to lift the platform slightly, sliding the pins on the locked base ends forwardly enough to escape the sloped front edge 185b of the notch 185a in the safety catches. The safety lever 181 at the front of the frame can then be pulled to activate the pull rod 182 and rotate the connecting rod 183. Rotation of the connecting rod lifts the catches 185, which then frees the pins 74a to permit the base ends 74 to move rearwardly. A safety catch in the release position is shown in FIG. 13C.

When using the preferred embodiment of the present invention, it may be seen that an ATV may be loaded onto the trailer with the runners 80 in the transport position and the ramp 44 in the loading position. The ramp may then be raised and the entire hunting stand/trailer combination, with ATV loaded thereon, may be hauled by a full-size motor vehicle to a general hunting area. Upon arrival, the trailer may be uncoupled from the full-size vehicle, the ramp lowered and the ATV unloaded. The ATV may then be coupled to the trailer hitch 40 and used to haul the hunting stand/trailer combination to a specific hunting site. When the site has been reached, the trailer is leveled with the jacks 42, the runners 80 are pivoted to their open position, and the box enclosure 10 is raised to a vertical orientation with the help of the gas shocks 87. Using the handles 152 on the bottom of the rear panel 50, the box 10 is unfolded and locked into the erected position with the door bolts 153a and 153b. Responsive to the power source, the scissor action support structure 20 elevates the platform 60 and erected box enclosure 10. When the box and platform have been fully elevated, the scissor action support structure is locked into position by automatic operation of the catches 185 of the safety locking mechanism 184. The ladder 64, while folded, is lifted up and the top of the ladder is hooked over the platform rod 158 and the lower end of the upper portion 64a is hooked over the rear horizontal stabilizing member 90 using the hook-like extensions 165. The lower portion 64b of the ladder is then unfolded or rotated 180° about the hinges until the bottom of the lower portion of the ladder is situated on the frame floor 159. The hunter may then climb up the ladder and access the rear side of the hunting box enclosure 10.

When the day's hunt is complete, the hunter descends from the box using the ladder. The lower portion 64b of the ladder is folded or rotated 180° about the hinges 64c until the bottom of the lower portion is adjacent to the top of the upper portion 64a. The folded ladder is then lifted up to disengage the hooking members and removed. To release the scissor action support structure 20, the winch 94 is activated to lift the platform 60 just enough to allow the safety lever 181 to be pulled to rotate the connecting rod 183 and thereby release the safety catches 185. When the scissor action support structure 20 is unlocked, it is lowered responsive to the lifting mechanism. When the scissor action support structure is fully lowered, the door bolts 153a and 153b locking the box into the erect position are opened, the door 57 is secured with the outer door securing bolt 155, and the side panels are pushed forward to fold the box. Once folded, the panels are lowered, with the help of the gas shocks 87, into a horizontal stack of panels.

The horizontal stack of panels and lowered scissor action support structure fit between the two side rails 62 and have a profile lower than the runners 80 in the transport position so as not to interfere therewith. The runners 80 are then pivoted into their transport position and the ladder 64 is stored between the runners. The leveling jacks 42 are lifted and retracted. The ATV is used to haul the hunting stand/ trailer combination back to the full-size vehicle. Upon arrival, the ramp 44 of the trailer 30 is lowered, and the ATV is unhitched from and loaded onto the trailer. No movement of the box 10, platform 60 and/or scissor action support structure 20 is necessary after hauling in order to load or unload the ATV. The trailer is then reconnected to the full-size vehicle, the ramp is raised, and the ATV and hunting stand/trailer combination are ready to be hauled to the next location. Upon reaching that location, the ATV may be unloaded without any movement of the box, platform and/or scissor action support structure being necessary.

The present invention may also be used as a portable, collapsible hunting stand without an ATV in those cases in which the full-size vehicle may be used to transport the trailer to the desired hunting location directly. In this embodiment, the runners when in the transport position may be used to support the loading of equipment, gear, or anything else that might be hauled on a trailer. Similarly, even in those instances when an ATV is used, gear may be loaded onto the runners after the ATV has been unloaded and hitched to the trailer for further travel.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed Is:

1. A portable, elevatable hunting stand for use in conjunction with an all-terrain vehicle comprising:
    a collapsible box enclosure supported by a platform, said box enclosure, when in use by a hunter, having wall panels in a generally vertical orientation and, when collapsed, said box enclosure forming a flat generally horizontal stack of wall panels;
    a wheeled trailer having a frame supporting said platform and a trailer support structure for transporting said all-terrain vehicle loaded thereon, said trailer receiving said stack of wall panels in a storage condition for transport and supporting said box enclosure and platform when ready for use, said trailer support structure including a pair of reinforced wire runners, each of said wire runners having an inner portion and an outer portion which form an obtuse angle therebetween, said inner portion pivotally mounted to a respective side rail connected to said frame for angular displacement between a first open position in which said outer portion is moved outwardly, allowing the box enclosure to be unfolded for use, and a second transport position in which said outer portion is pivoted inwardly to overlay said horizontal stack of wall panels, the transport position allowing the wire runners to support the all-terrain vehicle loaded thereon;
    a lifting support structure mounted on said frame and attached to the platform, for raising and lowering the platform and box enclosure for use; and
    a power source for activating said lifting support structure.

2. The hunting stand as set forth in claim 1, wherein said lifting support structure comprises:
    two scissor action supports, spaced apart and connected by two horizontal stabilizing members, with each scissor action support having a first base end fixedly mounted to the trailer and a second base end slidingly supported by the trailer, and having a first upper end fixedly connected to said platform and a second upper end slidingly connected to said platform.

3. The hunting stand as set forth in claim 2, further comprising a ladder including:
    an upper portion having two side pieces joined by transverse rungs, each side piece having a curved piece at an upper end for hooking onto the platform, and further having an extension at a lower end for engaging one of the horizontal stabilizing members; and
    a lower portion having two side pieces joined by transverse rungs, the lower portion pivotally connected at an upper end to the lower end of said upper portion;
    wherein said ladder has a folded transport position, in which said lower portion is folded to be parallel with and adjacent to said upper portion and, when said lower portion is pivoted 180°, an extended climbing position in which said lower portion is in series with said upper portion and on a plane therewith.

4. The hunting stand as set forth in claim 2, said power source comprising:
    an electric winch controlled by a switch;
    a battery, operatively coupled to said winch;
    two lift arms, each pivotally mounted at a lower end to the frame for angular displacement between a horizontal transport position and an upwardly and forwardly directed lifting position, each lift arm having an upper pulley mounted on an inner surface at an upper end of said lift arm, and a lower pulley mounted on the inner surface at a lower end of said lift arm, each lift arm operatively connected to a respective scissor action support by a cable, the cable running from each side of the winch, through the lower pulley, through a center of the respective arm to the upper pulley, through a point of lift pulley mounted on an outside surface of the respective scissor action support, and then back to the respective lift arm, an end of the cable being anchored to the respective lift arm;
    said pulleys and said cable transferring rotational power from said winch to vertical lift on said scissor action supports at the point of lift pulley to unfold the scissor action supports and raise the platform.

5. The hunting stand as set forth in claim 4 wherein the lift arms move from the horizontal transport position to the upwardly and forwardly directed lifting position responsive to tension applied to the cable so as to follow a center of load.

6. The hunting stand as set forth in claim 2, said power source comprising:
   a hydraulic cylinder, operatively connected between said frame and a point of lift on one of said scissor action supports; and
   a hydraulic pump power assembly, operatively coupled to said hydraulic cylinder, for effecting extension and retraction of said hydraulic cylinder, said hydraulic cylinder applying upward force at the point of lift to unfold the scissor action support and raise the platform.

7. The hunting stand as set forth in claim 2, further comprising a safety locking mechanism for locking said lifting support structure with said platform and box enclosure in a raised position.

8. The hunting stand as set forth in claim 7, said safety locking mechanism including:
   a plurality of safety catches, each safety catch having a pointed tip at a rearward end, an underside of the pointed tip sloping forwardly and downwardly to a slope end, and a notched area forward of the slope end;
   a connecting rod running transverse to the safety catches, a forward end of each of said plurality of safety catches connected to said connecting rod, said connecting rod having an upwardly extending arm;
   a pull rod oriented generally perpendicular to said connecting rod, said pull rod having a first end and-a second end, the first end connected to the upwardly extending arm; and
   a safety lever mounted to the frame and connected to the second end of said pull rod, wherein upon elevation of the scissor action supports, a pin extending laterally from the second base end rides along the underside of the pointed tip and then is caught in the notched area of said safety catches.

9. The hunting stand as set forth in claim 1, wherein when the platform is lowered and the runners are in the transport position, the all-terrain vehicle can be loaded, the trailer towed to a location, and the all-terrain vehicle unloaded without adjusting an elevation of the platform.

10. A portable, elevatable hunting stand comprising:
    a foldable, collapsible box enclosure supported by a platform, the box enclosure having four wall panels that, when erected and unfolded, stand vertically upright and enclose a space defined by four approximately 90° corners and, when folded one against another and collapsed, form a flat horizontal stack of wall panels;
    a trailer having a frame supporting said platform and two side members, each side member supporting a reinforced wire runner having an inner portion and an outer portion which form an obtuse angle therebetween, said inner portion of said wire runner pivotally mounted to said side member for angular displacement of the wire runner between a first open position in which said outer portion is substantially vertically oriented allowing the box enclosure to be unfolded and, when the box enclosure is folded and collapsed, a second transport position in which said outer portion is substantially horizontally oriented directly above and overlaying the horizontal stack of wall panels, the transport position allowing the runner to support equipment loaded thereupon;
    a scissor action support structure, having a lower end mounted on said trailer frame and an upper end attached to the platform, for raising and lowering the platform; and
    a power source for activating said scissor action support structure.

11. The hunting stand as set forth in claim 10, said trailer further having an access ramp, pivotally mounted to a rear of said trailer for angular displacement between a first rearwardly and downwardly inclined loading position and a second upwardly projecting upright position.

12. The hunting stand as set forth in claim 10, wherein the wall panels include two side wall panels, each hinged along a longitudinal center line, a solid rear wall panel and a solid front wall panel, longitudinal outer edges of each wall panel connected by hinges to longitudinal outer edges of adjoining wall panels, the rear wall panel having a door and hardware for engaging the platform to lock the box enclosure into the erected and unfolded position during use of the box.

13. The hunting stand as set forth in claim 12, the box enclosure further comprising a roof panel, hingeably connected to an upper lateral edge of the front wall panel, for pivoting to contact upper lateral edges of the side wall panels and rear wall panel and thereby cover the enclosed space.

14. The hunting stand as set forth in claim 12, the box enclosure further comprising two gas shocks, each gas shock mounted at a lower end to the platform and connected at an upper end near a hinged connection between the front wall panel and a respective side wall panel, said gas shocks for facilitating erection and collapse of the wall panels.

15. The hunting stand as set forth in claim 10, said power source comprising:
    an electric winch controlled by a switch;
    a battery, operatively coupled to said winch;
    two lift arms, each pivotally mounted at a lower end to the frame for angular displacement between a horizontal transport position and an upwardly and forwardly directed lifting position, each lift arm having an upper pulley mounted on an inner surface at an upper end of said lift arm, and a lower pulley mounted on the inner surface at a lower end of said lift arm, each lift arm operatively connected to said scissor action support structure by a cable, the cable running from each side of the winch, through the lower pulley, through a center of the respective arm t the upper pulley, through a point of lift pulley mounted on a respective side of said scissor action support structure, and then back to the respective lift arm, an end of the cable being anchored to the respective lift arm;
    said pulleys and said cable transferring-rotational power from said winch to vertical lift on said scissor act on support structure at the point of lift pulleys to unfold the scissor action support structure and raise the platform.

16. The hunting stand as set forth in claim 15, said scissor action support structure having two base ends fixedly mounted to the trailer and two base ends slidingly supported by the trailer, each of the slidingly supported base ends having a pin for locking said scissor action support structure in an elevated position.

17. The hunting stand as set forth in claim 16, further comprising a safety locking mechanism including:
    a plurality of safety catches, each safety catch having a sloped portion and a notched area such that, as said scissor action support structure is elevated, the pins of the slidingly supported base ends ride along the sloped portion and, when said scissor action support structure reaches full elevation, the pins are caught in the notched area of the safety catches;

a connecting rod running transverse to the safety catches for connecting said plurality of safety catches;

a pull rod oriented generally perpendicular to said connecting rod, said pull rod having a first end and a second end, the first end connected to the connecting rod; and a safety lever mounted to the frame and connected to the second end of said pull rod, for rotating the connecting rod to release the safety catches.

18. A portable, elevatable hunting stand comprising:

a collapsible box enclosure supported by a platform, said box enclosure, when in use by a hunter, having wall panels in a generally vertical orientation and, when collapsed, said box enclosure forming a flat generally horizontal stack of wall panels;

a wheeled trailer for receiving said stack of wall panels in a storage condition for transport and supporting said box enclosure and platform when ready for use;

a lifting support structure mounted on said trailer and attached to the platform, for raising and lowering the platform and box enclosure for use, said lifting support structure including two scissor action supports, spaced apart and connected by two horizontal stabilizing members, with each scissor action support having a first base end fixedly mounted to the trailer and a second base end slidingly supported by the trailer, and having a first upper end fixedly connected to said platform and a second upper end slidingly connected to said platform; and a power source for activating said lifting support structure, said power source including, an electric winch controlled by a switch;

a battery, operatively coupled to said winch;

two lift arms, each pivotally mounted at a lower end to the trailer for angular displacement between a horizontal transport position and an upwardly and forwardly directed lifting position, each lift arm having an upper pulley mounted on an inner surface at an upper end of said lift arm, and a lower pulley mounted on the inner surface at a lower end of said lift arm, each lift arm operatively connected to a respective scissor action support by a cable, the cable running from each side of the winch, through the lower pulley, through a center of the respective arm to the upper pulley, through a point of lift pulley mounted on an outside surface of the respective scissor action support, and then back to the respective lift arm, an end of the cable being anchored to the respective lift arm;

said pulleys and said cable transferring rotational power from said winch to vertical lift on said scissor action supports at the point of lift pulley to unfold the scissor action supports and raise the platform.

19. The hunting stand as set forth in claim 18, said wheeled trailer including a pair of reinforced wire runners pivotally mounted thereto for angular displacement between a first open position which allows the box enclosure to be unfolded for use, and a second transport position in which the runners overlay said horizontal stack of wall panels to support an all-terrain vehicle loaded thereon.

20. A portable, elevatable hunting stand comprising:

a collapsible box enclosure supported by a platform, said box enclosure, when in use by a hunter, having wall panels in a generally vertical orientation and, when collapsed, said box enclosure forming a flat generally horizontal stack of wall panels;

a wheeled trailer for receiving said stack of wall panels in a storage condition for transport and supporting said box enclosure and platform when ready for use;

a lifting support structure mounted on said trailer and attached to the platform, for raising and lowering the platform and box enclosure for use, said lifting support structure including two scissor action supports, spaced apart and connected by two horizontal stabilizing members, with each scissor action support having a first base end fixedly mounted to the trailer and a second base end slidingly supported by the trailer, and having a first upper end fixedly connected to said platform and a second upper end slidingly connected to said platform;

a power source for activating said lifting support structure; and a safety locking mechanism for locking said lifting support structure with said platform and box enclosure in a raised position, said safety locking mechanism including, a plurality of safety catches, each safety catch having a pointed tip at a rearward end, an underside of the pointed tip sloping forwardly and downwardly to a slope end, and a notched area forward of the slope end;

a connecting rod running transverse to the safety catches, a forward end of each of said plurality of safety catches connected to said connecting rod, said connecting rod having an upwardly extending arm;

a pull rod oriented generally perpendicular to said connecting rod, said pull rod having a first end and a second end, the first end connected to the upwardly extending arm; and a safety lever mounted to the frame and connected to the second end of said pull rod, wherein upon elevation of the scissor action supports, a pin extending laterally from the second base end rides along the underside of the pointed tip and then is caught in the notched area of said safety catches.

* * * * *